(12) United States Patent
Anderson et al.

(10) Patent No.: US 6,797,376 B2
(45) Date of Patent: Sep. 28, 2004

(54) FIBER-METAL LAMINATE ADHESIVE COATING

(75) Inventors: Robert A. Anderson, Federal Way, WA (US); William B. H. Grace, Seattle, WA (US); Stephen R. Barnes, Rainier, WA (US); Matthew S. Tillman, Lynnwood, WA (US); Kay Y. Blohowiak, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 10/143,375

(22) Filed: May 9, 2002

(65) Prior Publication Data

US 2003/0211318 A1 Nov. 13, 2003

(51) Int. Cl.⁷ ................................................. B32B 7/12
(52) U.S. Cl. .................. 428/355 EP; 428/344; 549/512; 549/523
(58) Field of Search .......................... 428/355 EP, 344; 549/512, 523

(56) References Cited

U.S. PATENT DOCUMENTS

| | | | |
|---|---|---|---|
| 4,374,890 A | * | 2/1983 | Shimizu et al. ............. 428/212 |
| 4,500,660 A | | 2/1985 | Minamisawa et al. |
| 4,833,204 A | | 5/1989 | Yusa et al. |
| 5,151,327 A | * | 9/1992 | Nishiyama et al. .......... 428/343 |
| 5,160,783 A | * | 11/1992 | Nemoto et al. .............. 428/261 |
| 5,958,578 A | * | 9/1999 | Blohowiak et al. .......... 428/336 |
| 6,037,060 A | * | 3/2000 | Blohowiak et al. .......... 428/450 |
| 6,303,219 B1 | * | 10/2001 | Sawamura et al. .......... 428/343 |

FOREIGN PATENT DOCUMENTS

| | | |
|---|---|---|
| DE | 35 08 600 A | 9/1986 |
| DE | 35 08 601 A | 9/1986 |
| EP | 0 303 468 A | 2/1989 |

* cited by examiner

*Primary Examiner*—Daniel Zirker
(74) *Attorney, Agent, or Firm*—Black Lowe & Graham PLLC; Dale C. Barr

(57) ABSTRACT

The present invention provides a metallic member reinforcing epoxy-based adhesive coating. The epoxy-based adhesive coating including a first epoxy material containing approximately 25% solids by weight and a second curative material containing about 32% solids by weight. According to one aspect of the present invention, the first epoxy offered suitably includes about 3% to about 35% liquid Diglycidylether of Bisphenol-A, about 35% to about 60% solid Diglycidylether of Bisphenol-A, about 10% to about 30% Novolac-Epoxy, and about 5% to about 18% Solid Carboxy—Terminated Acrylonitrile—Butadiene Rubber, and the second curative material suitably includes about 0% to about 100% 4,4'-Diaminodiphenylsulfone, about 0% to about 100% 3,3'-Diaminodiphenylsulfone, and about 0% to about 0.2% Chromium octoate.

12 Claims, 2 Drawing Sheets

US 6,797,376 B2

FIBER-METAL LAMINATE ADHESIVE COATING

RELATED PATENTS

The related patents are U.S. Pat. No. 5,814,137 issued Sep. 29, 1998, U.S. Pat. No. 5,849,110 issued Dec. 15, 1998, U.S. Pat. No. 5,869,141 issued Feb. 9, 1999, U.S. Pat. No. 5,939,197 issued Aug. 17, 1999, U.S. Pat. No. 5,958,578, and U.S. Pat. No. 6,037,060 issued Mar. 14, 2000, all of which are incorporated by reference herein.

RELATED APPLICATION

Additionally, this application incorporates by reference the application titled "Method for Preparing a Metal Material for Bonding" invented by Kay Y. Blohowiak et al.; U.S. patent application Ser. No. 10/143,391, filed May 9, 2002.

FIELD OF THE INVENTION

This invention relates generally to epoxy compositions and, more specifically, to epoxy based adhesive coatings for metallic substrates.

BACKGROUND OF THE INVENTION

Film adhesive layers are commonly applied to metallic surfaces. Existing film adhesive materials include both composite-bonding and metal-bonding materials. These existing bonding materials do not show adequate adhesive properties, such as peel strength and wedge crack resistance, to make them useable in a production environment for fiber metal laminates. Additionally, film adhesive materials have an inherent thickness that makes film type adhesives less effective when a thin coating is desired. More specifically, film adhesive materials contain a carrier scrim to provide film integrity and bondline thickness control. In many applications, this scrim is not necessary and only adds unnecessary thickness and weight.

In addition to the inherent physical limitation described above, film adhesives are subject to manufacturing limitations. Film adhesives are designed for use in film form only. They are, therefore, unusable as a solution material for continuous processing, such as interposing the adhesive layer with a secondary structure. Additionally, the film adhesive layers do not lend themselves easily to continuous, roll-to-roll manufacturing processes.

Therefore, there is an unmet need in the art for an economical method of durably adhering a very thin adhesive layer to a metal surface.

SUMMARY OF THE INVENTION

The present invention provides an epoxy-based adhesive coating for a metallic member. The adhesive coating of the present invention is thinner than the known film adhesive materials and does not include a carrier scrim. As a result, the adhesive coating of the present invention is desirable for applications calling for a thin coating. Further, the adhesive coating of the present invention is usable as a solution material for continuous processing. Therefore, the present invention provides a more economical adhesive than known adhesives.

The epoxy-based adhesive coating includes a first epoxy material including approximately 25% solids by weight and a second curative material including approximately 32% solids by weight. According to one aspect of the present invention, the first epoxy material suitably includes about 3% to about 35% liquid Diglycidylether of Bisphenol-A, about 35% to about 60% solid Diglycidylether of Bisphenol-A, about 10% to about 30% Novolac-Epoxy, and about 5% to about 18% Solid Carboxy—Terminated Acrylonitrile—Butadiene Rubber, and the second curative material suitably includes about 0% to about 100% 4,4'-Diaminodiphenylsulfone, about 0% to about 100% 3,3'-Diaminodiphenylsulfone, and about 0% to about 0.2% Chromium octoate.

Another aspect of the present invention is a method of reinforcing a metallic foil. The method includes preparing a surface of the metallic foil to receive an epoxy based adhesive coating. An epoxy-based adhesive coating is applied and the adhesive coating is a two-part epoxy having a first epoxy material including approximately 25% solids by weight and a second curative material including approximately 32% solids by weight. The epoxy-based adhesive coating is cured on the metallic element.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
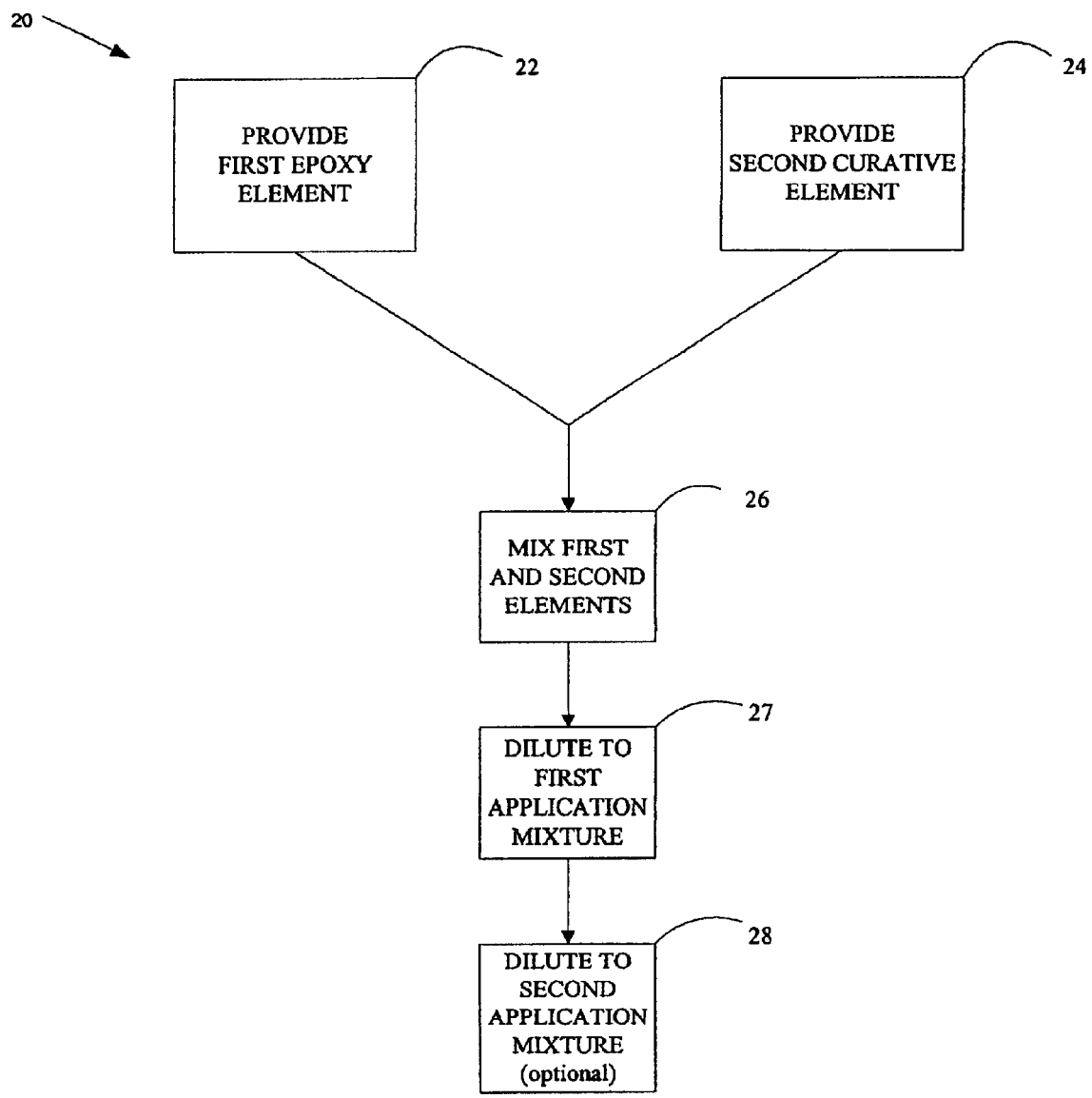
FIG. 1 is a flow chart of a method of forming an epoxy-based coating according to the invention.

The present invention provides a system and method of forming an epoxy-based adhesive coating for use with a metallic material to form metallic and metallic-fiber laminate structures. By way of overview and with reference to FIG. 1, the present invention includes a method 20 that provides first epoxy at a block element 22 and a second curative element at a block 24. The first and second curative elements are mixed at specific ratios to form a cocuring first application epoxy mixture at a block 26. A dilution step at a block 27 yields a second application epoxy mixture at a block 28. Specific details of the epoxy-based adhesive and its preferred application are described in more detail below.

The method 20 preferably employs a two-element epoxy composition. It will be appreciated that two-element epoxy-based systems are well known in the art. As a result, a detailed explanation of each of the blocks associated with the mixing of the elements is not necessary for understanding the invention. It will also be appreciated that the curing process of the epoxy composition is also well know in the art. Thus, a detailed description of the curing process is not necessary for an understanding of the present invention.

At the block 22, the first epoxy element is provided the first epoxy element contains about 25% solids by weight. In a presently preferred embodiment, the first epoxy element contains about 3% to about 35% liquid Diglycidylether of Bisphenol-A, about 35% to about 60% solid Diglycidylether of Bisphenol-A, about 10% to about 30% Novolac-Epoxy, and about 5% to about 18% Solid Carboxy-Terminated Acrylonitrile-Butadiene Rubber. However, the first epoxy element may also include other elements, including, without limitation, about 0% to about 12% Liquid Carboxy-Terminated Acrylonitrile-Butadiene Rubber.

At the block 24, the second curative element is provided. The second curative element contains about 32% solids by weight. The second curative element preferably contains about 0% to about 100% 4,4'-Diaminodiphenylsulfone, about 0% to about 100% 3,3'-Diaminodiphenylsulfone, and about 0 to about 0.2% Chromium octoate. However, other chemical compositions for the second curative element are considered within the scope of this invention, such as, without limitation about 70% to about 100% Dicyandiamide, about 0% to about 30% 3-(3,4-Dichlorophenyl)-1,1-dimethylurea, about 0% to about 30% of another substituted urea, and about 0% to about 0.2% Chromium octoate.

In a presently preferred embodiment, at a block 26 the first epoxy element is mixed with the second curative element at a ratio of about 10 parts of the first epoxy element to about 1 part of the second curative element. However, it will be appreciated that any other mixing ratio, without limitation, is within the scope of this invention. At the block 26, the first and second curative elements are mixed together with an organic solvent, such as, without limitation, acetone, to form a first application epoxy mixture.

In a presently preferred embodiment, at the block 26, the first application epoxy mixture is diluted with the solvent in a well known manner in the art such that the first application epoxy mixture is about 0% to about 40% solvent. As will be readily understood by a person having ordinary skill in the art, the amount of solvent added to the first application epoxy mixture is largely determined by the nature in which the first application epoxy mixture will be employed. For example, it has been determined, that a first application epoxy mixture having about 0% to about 40% solvent is ideal for curtain and curtain-type application processes.

If desired, at a block 27 the first application epoxy mixture 26 may be diluted further by adding more solvent to yield a second application epoxy mixture at a block 28. Preferably, the second application epoxy mixture is about 91% solvent. It will be appreciated by those skilled in the art that the second application epoxy mixture is well suited for roll coat and spray-type application processes. It will additionally be appreciated that the concentration of solvent within the first application epoxy mixture and the second application epoxy mixture may fall below or exceed the preferred solvent ranges listed above as determined by a particular application.

Figure 2:
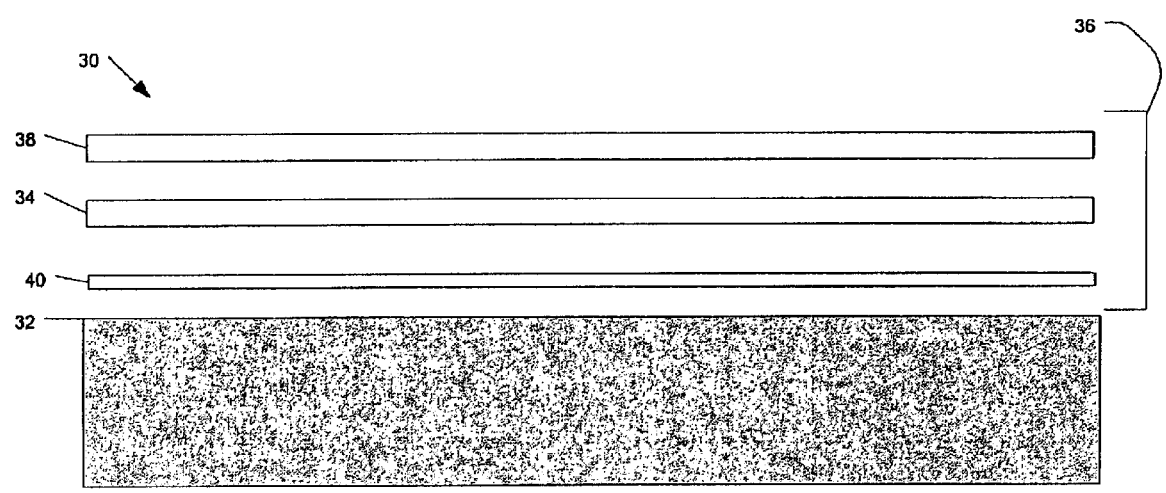
FIG. 2 is an exploded view of a metal laminate according to the invention.

Referring now to FIG. 2, a laminate structure 30 includes a metallic material 32 bonded with a coating mixture 36. The metallic material 32 is preferably titanium and is preferably a foil Ti-15V-3Cr-3Al-3Sn alloy, and is suitably less than about 0.015 inches thick. However, other metallic materials, such as, without limitation, aluminum, are within the scope of this invention. Additionally, it is anticipated that the present invention is employable with metallic material of any thickness. Further, the process of the instant invention is preferably utilized to form titanium/graphite laminate structures. However, any other fiber/metal or metal/metal laminate such as, without limitation, a titanium/titanium laminate structure is also considered within the scope of this invention.

The coating mixture 36 includes a bonding agent 40, such as, without limitation, a sol-gel mixture. The coating mixture 6 further include an epoxy layer 34 and a secondary structural material 38, such as, without limitation, a graphite prepreg material. The epoxy layer 34 may be a topcoat, as depicted in FIG. 2, or the epoxy layer 34 may be interposed with the secondary structural material 38.

Whether the epoxy layer 34 is a topcoat or is interposed with the secondary structural material 38, the epoxy layer 34 is a suitably thin layer. In a presently preferred embodiment, the epoxy layer 34 is about 0.0010 inches thick. However, it will be appreciated that the epoxy layer 34 may be thicker or thinner depending upon the application without departing from the spirit of the present invention. For example, if a secondary structural material 38 having a greater thickness is interposed with the epoxy layer 34, then a greater overall thickness may result. Conversely, when the secondary structural material 38 is relatively smaller, a thinner overall thickness may result.

It will be appreciated that the bonding agent 40 serves to increase bond strength between the metallic material 32 and the coating mixture 6. It will also be appreciated that during curing of the epoxy layer 34, after application, the epoxy layer 34 cross-links with the bonding agent 40 to provide a strong, durable bond between the interposed epoxy layer 34 and secondary structural material 38 and the bonding agent 40.

In a presently preferred embodiment, the laminate structure 30 is produced by a continuous, coil-to-coil type production process. However, it will be appreciated that in present invention is employable with other production techniques, such as, without limitation, a batch process.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An epoxy based adhesive coating, comprising:
   (a) an epoxy material containing approximately 25% solids by weight, comprising about 3% to about 35% by weight liquid diglycidylether of bisphenol-A, about 35% to about 60% by weight solid diglycidylether of bisphenol-A, about 10% to about 30% by weight novolac-epoxy, and about 5% to about 18% by weight solid carboxy—terminated acrylonitrile—butadiene rubber; and
   (b) a curative material containing about 32% solids by weight comprising about 0% to about 100% by weight 4.4'-diaminodiphenylsulfone, about 0% to about 100% by weight 3,3'-diaminodiphenylsulfone, and about 0% to about 0.2% by weight chromium octoate.

2. The epoxy based adhesive coating of claim 1 wherein the epoxy material further includes about 0% to about 12% by weight Liquid Carboxy—Terminated Acrylonitrile—Butadiene Rubber.

3. The epoxy based adhesive coating of claim 1, wherein the curative material comprises about 70% to about 100% by weight dicyandiamide, about 0% to about 30% by weight 3-(3,4-Dichlorophenyl)-1,1-dimethylurea, and about 0% to about 30% by weight of another substituted urea.

4. A laminate structure, comprising:
   (a) a metallic member; and
   (b) an epoxy cured based adhesive coating adjacent the metallic member, the epoxy based adhesive coating including a first epoxy material containing approximately 25% solids by weight formed from a composition comprising about 3% to about 35% by weight liquid diglycidylether of bisphenol-A, about 35% to about 60% by weight solid diglycidylether of bisphenol-A, about 10% to about 30% by weight novolac-epoxy, and about 5% to about 18% by weight solid carboxy—terminated acrylonitrile—butadiene rubber, and a curative material containing about 32% solids by weight comprising about 0% to about 100% by weight 4,4'-diaminodiphenylsulfone, about 0% to about 100% by weight 3,3'-diaminodiphenylsulfone, and about 0% to about 0.2% by weight chromium octoate, wherein the cured epoxy based adhesive coating is about 0.0010 inches thick.

5. The laminate structure of claim 4, wherein the epoxy material further includes about 0% to about 12% by weight Liquid Carboxy—Terminated Acrylonitrile—Butadiene Rubber.

6. The laminate structure of claim 4, wherein the curative material further includes about 70% to about 100% by weight Dicyandiamide, about 0% to about 30% by weight 3-(3,4-Dichlorophenyl)-1,1-dimethylurea, and about 0% to about 30% by weight of another substituted urea.

7. The laminate structure of claim 4, wherein the metallic member is titanium.

8. The laminate structure of claim 4, including a graphite fiber member interposed within the epoxy based adhesive coating.

9. A method of reinforcing a metallic foil, the method comprising:

(a) preparing a surface of a metallic foil to receive an epoxy based adhesive coating; and (b) applying the epoxy based adhesive coating, wherein the adhesive coating is a two part epoxy having a epoxy material containing approximately 25% solids by weight comprising about 3% to about 35% by weight liquid diglycidylether of bisphenol-A, about 35% to about 60% by weight solid diglycidylether of bisphenol-A, about 10% to about 30% by weight novolac-epoxy, and about 5% to about 18% by weight solid carboxy—terminated acrylonitrile—butadiene rubber and a curative material containing about 32% solids by weight comprising about 0% to about 100% by weight 4,4'-diaminodiphenylsulfone, about 0% to about 100% by weight 3,3'-diaminodiphenylsulfone, and about 0% to about 0.2% by weight chromium octoate, wherein the cured epoxy based adhesive coating is about 0.0010 inches thick.

10. The method of claim 9, wherein the metallic foil is titanium or titanium alloy.

11. The method of claim 9, wherein the epoxy material further includes about 0% to about 12% by weight Liquid Carboxy—Terminated Acrylonitrile—Butadiene Rubber.

12. The method of claim 9, wherein the curative material includes about 70% to about 100% by weight dicyandiamide, about 0% to about 30% by weight 3-(3,4-dichlorophenyl)-1,1-dimethylurea, and about 0% to about 30% by weight of another substituted urea.

* * * * *